US012049988B2

(12) United States Patent
D'Incecco et al.

(10) Patent No.: US 12,049,988 B2
(45) Date of Patent: Jul. 30, 2024

(54) LAMP

(71) Applicant: OSRAM GmbH, Munich (DE)

(72) Inventors: Enrico D'Incecco, Pordenone (IT); Riccardo Castellan, Volpago del Montello (IT); Alessandro Bizzotto, Castelfranco Veneto (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 18/546,011

(22) PCT Filed: Feb. 15, 2022

(86) PCT No.: PCT/IB2022/051329

§ 371 (c)(1),
(2) Date: Aug. 10, 2023

(87) PCT Pub. No.: WO2022/185136

PCT Pub. Date: Sep. 9, 2022

(65) Prior Publication Data

US 2024/0183504 A1 Jun. 6, 2024

(30) Foreign Application Priority Data

Mar. 2, 2021 (IT) ........................ 102021000004856

(51) Int. Cl.
*F21K 9/23* (2016.01)
*F21S 41/151* (2018.01)
(Continued)

(52) U.S. Cl.
CPC ........... *F21S 41/151* (2018.01); *F21S 41/663* (2018.01); *F21W 2102/13* (2018.01)

(58) Field of Classification Search
CPC ...... F21S 41/151; F21S 41/663; F21S 41/141; F21S 41/192; F21S 45/47; F21W 2102/13;
(Continued)

(56) References Cited

U.S. PATENT DOCUMENTS

| | | | |
|---|---|---|---|
| 11,199,297 | B2 | 12/2021 | Schoenfelder et al. |
| 2010/0213809 | A1 | 8/2010 | Roehl et al. |
| 2019/0184891 | A1 | 6/2019 | Grave |

FOREIGN PATENT DOCUMENTS

| | | | |
|---|---|---|---|
| CN | 205606398 | U | 9/2016 |
| EP | 3839322 | A1 | 6/2021 |

(Continued)

*Primary Examiner* — Elmito Breval
(74) *Attorney, Agent, or Firm* — Slater Matsil, LLP

(57) ABSTRACT

In an embodiment, an automotive solid-state lamp includes a lamp body extending along a longitudinal reference axis between a proximal base portion and a distal front portion, wherein the lamp body includes a support member having first and second opposed sides, and wherein each one of the opposed sides of the support member has arranged thereon a first array of solid-state light sources having a shield optically coupled therewith and configured to provide, when energized, an automotive low-beam, a second array of solid-state light sources located between the base portion and the first array of solid-state light sources, the second array of solid-state light sources spaced from the first array of solid-state light sources and configured to provide, when energized, an automotive high-beam, wherein the second array of solid-state light sources includes a first single row of solid-state light sources extending longitudinally of the lamp body and a second single row of solid-state light sources.

15 Claims, 8 Drawing Sheets

(51) Int. Cl.
*F21S 41/663* (2018.01)
*F21W 102/13* (2018.01)

(58) Field of Classification Search
CPC .......... F21V 17/12; F21V 19/00; F21V 23/00; B60Q 1/0433
See application file for complete search history.

(56) References Cited

FOREIGN PATENT DOCUMENTS

| | | | |
|---|---|---|---|
| KR | 20160101380 | A | 8/2016 |
| TW | M498688 | U | 4/2015 |
| WO | 2018162341 | A1 | 9/2018 |

PRIOR ART

LAMP

CROSS-REFERENCE TO RELATED APPLICATIONS

This patent application is a national phase filing under section 371 of PCT/IB2022/051329, filed Feb. 15, 2022, which claims the priority of Italian patent application 102021000004856, filed Mar. 2, 2021, each of which is incorporated herein by reference in its entirety.

TECHNICAL FIELD

The present description relates to lamps. One or more embodiments may be applied to lamps employing solid-state light sources, e.g., LED sources. One or more embodiments may be advantageously employed in the automotive sector, for example as automotive retrofit lamps for motor vehicles.

BACKGROUND

In fields of use such as, for example, the automotive sector, light sources such as LED sources may offer various advantages compared to conventional lamps or bulbs.

For example, LED sources are brighter, quicker on power up and may easily be PWM modulated in order to adjust the intensity of the emitted light.

Another advantage derives from the fact that LED chips may be operated in array, in parallel or in mixed configurations, and exhibit a rather long-time durable life.

Therefore, a growing trend has been observed towards developing and designing LED lamps which may be employed instead of conventional lamps, e.g., instead of halogen lamps, while being adapted to comply with specifications.

As a matter of fact, it is reasonable to foresee that in the near future automotive lamps, such as those lamps currently named H-type lamps, will be replaced almost completely by LED lamps.

There are already known various solutions of automotive retrofit lamps, for example H-type lamps.

For example, the US Patent Application published as US2010/0213809 (Roehl) describes a lamp having a closed cap, wherein the light emission is provided by one or more semiconductor light sources and the output flux is predetermined by the distance and the position of the (LED) sources with respect to the reference plane of the cap.

Documents CN 205606398 U and WO 2018/162341 A1 describe similar solutions.

European Patent Application 20209701.0 filed on the 25 Nov. 2020 with priority claim of the Italian Patent Application 102019000024226 of 17.12.2019 (inventors: Apuzzo, Bizzotto, Castellan) describes an H7 retrofit lamp for low-beam applications which favours compliance with ECE R112 Regulation, by having the light distribution coming from two opposite linear LED arrays or clusters operate in two different modes: by providing either direct light, if this is desired for safety reasons, or indirect/reflected light for the points above cut-off, which illuminates road panels.

The achievement of such a result is made easier by properly shaping the surface of the LED housing, combined with the optical properties of the materials.

The H-type retrofit solutions normally envisage the presence of LED arrays or clusters arranged linearly, so as to mimic the light emission surface of a filament lamp.

FIG. 1 is a side elevation view of a solid-state H4 retrofit lamp for motor vehicles, available from the companies of the OSRAM group under the trade name of H4 3.5 (9726CW 14 W 12V/24V P43T 4×2 OSRAM).

Such a lamp, generally denoted by 10, comprises a lamp body extending along a reference axis X10 between a proximal base portion 101 and a distal front portion 102. The lamp body comprises a (e.g., plate-like) support member 12 having a first and a second mutually opposed sides.

On each of the opposed sides (or faces) of the support member 12 there are arranged: a first array (or cluster) of solid-state (e.g., LED) light sources 141, having a shield 150 optically coupled therewith, so as to provide, when the sources of array 141 are energized, a low-beam, a second array (or cluster) of solid-state (again, for example, LED) light sources 142, located between the base portion 101 and the first array of solid-state light sources 141.

The second array of solid-state light sources 142 is spaced from the first array of solid-state light sources 141, and energizing the sources of array 142 leads to providing a high-beam.

The LEDs of arrays 141 and 142, each comprising three LEDS, are (6×) Samsung LH181A LEDs, all having the same configuration, with a light emitting area (LEA) of 1.91×1.91 mm.

Lamp 10 comprises a mounting member 20, adapted to mount lamp 10 onto a vehicle. Said mounting member 20 includes, at the rear base portion 101 of the lamp body 10, at least one ring-shaped reference formation 201, which defines a reference plane RP transversely of the reference axis X10.

The lamp body 10 includes two parts having heatsink properties, enclosing a planar printed circuit board (PCB), the LED arrays 141, 142 being arranged on both opposed sides or faces of the board, so as to emit light in opposite directions, i.e., towards opposed half-spaces.

The purpose of such arrangement is to reproduce the behaviour of conventional filament lamps, which produce a cylindrical distribution of light around the lamp, therefore providing a luminous flux equivalent to that of the filament of an incandescent bulb.

The two heatsink parts or bodies protect the electronics underneath and help the light emitted by the LEDs to generate a radiation beam within the cut-off angles specified by ECE R112 Regulation.

To this end, the lamp body 10 has, at the LED arrays 141 and 142, windows through which radiation is emitted with a radiation pattern mimicking the near-field distribution of a conventional filament lamp.

In the lamp shown in FIG. 1, the lamp body is produced by metal (aluminium) moulding. A polymeric material may be considered an alternative option.

The shape of the lamp body controls the distribution of the light coming from the white light emitted by the LEDs with a Lambertian distribution. The light distribution is mainly determined by the position of the LED arrays and by the position of the single LEDs within an array.

In the lamp shown in FIG. 1, the LEDs of both arrays 141 and 142 on each side of the lamp have a linear arrangement: a row of three LEDs aligned in the direction of axis X10 in each array 141, 142, with the two arrays 141, 142 substantially aligned with each other at said axis, in order to mimic (approximate) the light emitting surface of a standard filament source.

Table I in the following shows some characteristic values of arrays 141 and 142 of the lamp shown in Figure I, which are presented by way of comparison with the corresponding values in a conventional H4 lamp.

TABLE I

| LED H4 3.5 OSRAM vs. conventional H4 filament lamp | | |
|---|---|---|
| Lamp type<br>Source | Conventional<br>H4<br>Filament | H4 3.5 (9726CW<br>14 W 12 V/24 V<br>P43T 4x2<br>OSRAM).<br>(6x) Samsung LH 181 LED |
| e: distance Lo-Beam/ reference plane RP [mm] | 28.5 | 28.5 |
| f: distance (separation) Lo-Beam/Hi-Beam [mm] | 1.7 | 1.7 |
| y_o: distance of Hi-beam array side aligned with shield 150/reference axis X10 [mm] | 1.5 | 1.4 |
| y_tot: Width of Hi-Beam array [mm] | 1.7 | 1.9 |
| Z_HB: Length of Hi-Beam array [mm] | 4.75 | 6.1 |
| Power [W] | 60 (Hi-Beam)/ 55 (Lo-Beam) | 14 (Hi-Beam)/ 14 (Lo-Beam) |
| Luminous flux [lm] | 1650 (Hi-Beam)/ 1000 (Lo-Beam) | 1380 (Hi-Beam)/ 1130 (Lo-Beam) |

The distances referring to the LEDs are measured with reference to the light emitting areas (LEA) thereof.

It will be observed that, for a LED lamp as shown in FIG. 1, achieving a high intensity luminous flux and a good light distribution is still a critical aspect, especially as regards the H-V central point of the pattern.

In order to better comprehend this aspect, it may be useful to refer explicitly to the ECE R112 Regulation: Table II reproduces (with the original English wording, wherein cd=candles) Table 6.3.3 from pages 20-21 of the Regulation.

TABLE II

| ECE R112 Regulation - pp. 20-21 | | | |
|---|---|---|---|
| Test point | Angular coordinates - Degrees | Class A Headlamp Required luminous intensity cd Min | Class B Headlamp Required luminous intensity cd Min |
| Imax | | 27,000 | 40,500 |
| H-5L | 0.0, 5.0 L | 3,400 | 5,100 |
| H-2.5L | 0.0, 2.5 L | 13,500 | 20,300 |
| H-2.5R | 0.0, 2.5 R | 13,500 | 20,300 |
| H-5R | 0.0, 5.0 R | 3,400 | 5,100 |

Point 6.3.3.1 of the Regulation, moreover, specifies that the intersection point (HV) of lines h and v must be located within the isolux of 80% of the maximum light intensity (Imax).

The meaning of the names and acronyms appearing in the foregoing is to be considered known to a person skilled in the art who is acquainted with specifications such as ECE 112 Regulation.

A problem which is encountered in existing retrofit lamps having H-type solid-state sources (and especially in the case of H4-type sources, as shown in FIG. 1) is due to an intensity distribution which is lower than in halogen lamps, with consequent difficulties in complying with specifications such as ECE R112 Regulation for the high-beam function.

SUMMARY

One or more embodiments aim at contributing to tackle the aspects outlined in the foregoing.

One or more embodiments favour achieving compliance with specifications such as ECE R112 Regulation, repeatedly mentioned in the foregoing, e.g., with reference to point 6.3.3.1, i.e., the achievement of high intensity (80% of the maximum light intensity value) on the central point H-V of the pattern.

One or more embodiments act on the shape of the array or cluster of the sources for a high-beam application.

One or more embodiments help overcoming the limitations of the known art, being adapted to comply with specifications as regards light intensity for all the points normed in ECE R112 Class B Regulation for high-beam applications.

One or more embodiments help achieving light intensity values higher than achievable either with standard LED configurations or with halogen lamps, while obtaining a more uniform light distribution as compared to a standard LED configuration.

BRIEF DESCRIPTION OF THE DRAWINGS

One or more embodiments will now be described, by way of non-limiting example only, with reference to the annexed Figures, wherein.

It will be appreciated that, for clarity and simplicity of illustration, the various Figures may not be drawn to the same scale.

Moreover, for the sake of brevity and unless the context dictates otherwise, similar parts or elements are denoted in the various Figures by the same reference symbols, without repeating a corresponding description for each Figure.

DETAILED DESCRIPTION OF ILLUSTRATIVE EMBODIMENTS

In the following description, various specific details are given to provide a thorough understanding of various exemplary embodiments according to the specification. The embodiments may be practiced without one or several specific details, or with other methods, components, materials, etc. In other instances, well-known structures, materials or operations are not shown or described in detail in order to avoid obscuring various aspects of the embodiments.

Reference throughout this specification to "one embodiment" or "an embodiment" means that a particular feature, structure or characteristic described in connection with the embodiment is included in at least one embodiment. Thus, the possible appearances of the phrases "in one embodiment" or "in an embodiment" in various places throughout this specification are not necessarily all referring exactly to the same embodiment. Furthermore, particular features, structures, or characteristics may be combined in any suitable manner in one or more embodiments.

The headings provided herein are for convenience only, and therefore do not interpret the extent of protection or scope of the embodiments.

In the figures, reference number 10 generally denotes a lamp which may be employed, for example, for retrofit, or optionally for the initial equipment of a light, e.g. a headlight, such as a low-beam and a high-beam projector of a vehicle such as a motor vehicle, not visible in the Figures.

Figure 3:
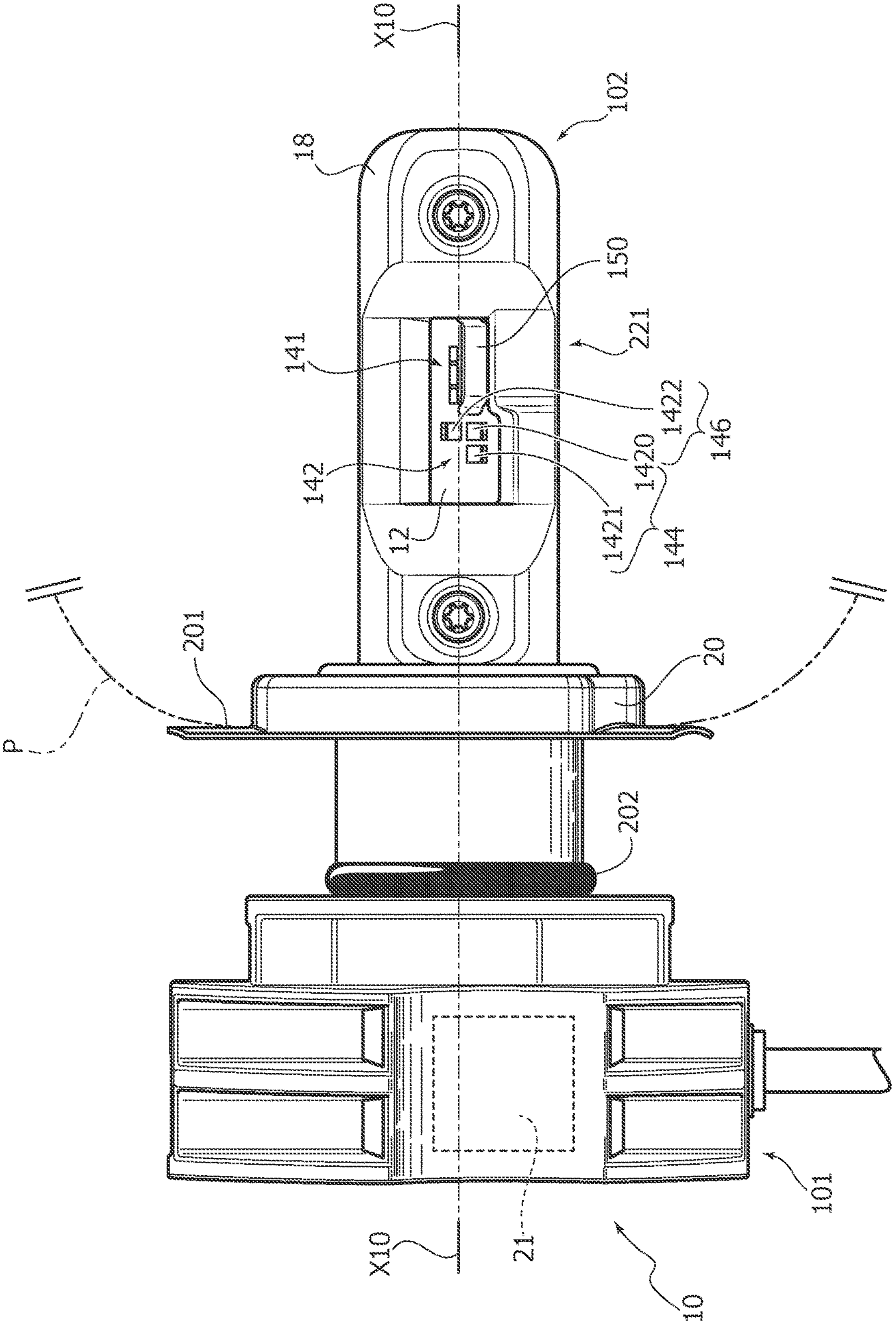
FIG. 3 is a view of a lamp as exemplified in FIG. 2, observed in side elevation.

In one or more embodiments, an automotive lamp 10 as exemplified herein is adapted to be mounted onto a support body P, the profile whereof is schematically indicated in FIG. 3 only and which, in the case of use in a (motor) vehicle headlight, may have the features of a projector.

In one or more embodiments as exemplified herein, lamp 10 may include a generally elongated body or housing, extending in the direction of a longitudinal reference axis X10 and having a base rear or proximal end 101 (adapted to be mounted, e.g., inserted, into support body P) and a front (distal) end 102 (from which light radiation is emitted in operation).

As exemplified in FIG. 3, lamp 10 may be mounted on the vehicle, i.e., on the support body P (a projector, for example) so that axis X10 is oriented in a substantially horizontal direction, the light radiation being emitted from the front end 102 and being equally oriented in a substantially horizontal direction, radially, i.e., laterally, to axis X10.

In one or more embodiments (see for instance the exploded perspective view of FIG. 2), the lamp body 10 may comprise a support 12 (e.g., a plate-like support, substantially corresponding to a printed circuit board, PCB) having opposed sides or faces, each of which being provided with two solid-state, e.g., LED, light sources which are denoted by references 141 and 142.

In the same way as the solution previously described with reference to FIG. 1, lamp 10 in FIG. 2 and following may therefore comprise a lamp body extending along a reference axis X10 between a proximal base portion 101 and a distal front portion 102, the lamp body comprising a (e.g., plate-like) support member 12 having a first and a second mutually opposed sides.

As in the solution previously described with reference to FIG. 1, in the lamp 10 of FIG. 2 and following, on each of the opposed sides (or faces) of support member 12 there are arranged:

a first array or cluster of solid-state (e.g., LED) light sources 141, having a shield 150 optically coupled thereto, in such a way as to provide, when sources 141 are energized, a low-beam, a second array or cluster of solid-state (again, for example, LED) light sources 142, located between the base portion 101 and the first array of solid-state light sources 141.

The second array of solid-state light sources 142 is spaced from the first array of solid-state light sources 141 and, when sources 142 are energized, is adapted to provide a high-beam.

The LEDs of arrays 141 and 142, each of which comprises three LEDs, may have the same configuration, for example (6×) Luxeon Z ES LEDs having the same configuration, with a light emitting area (LEA) of 1.5×1.5 mm.

Figure 2:
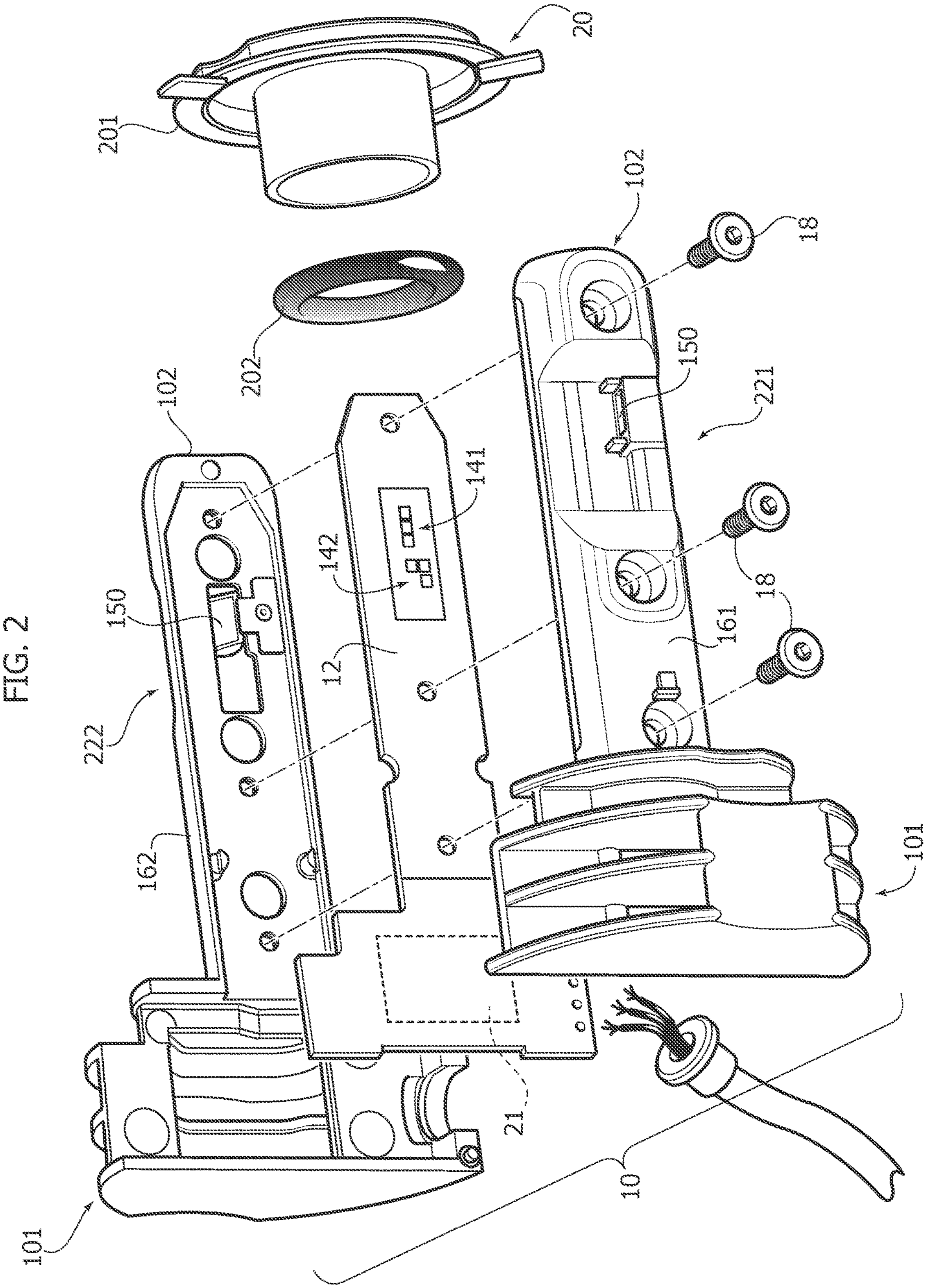
FIG. 2 is an exploded perspective view of a lamp according to embodiments.

Also in the case of the lamp shown in FIG. 2, a mounting member 20 is present which is configured to mount lamp 10 onto a vehicle. Said mounting member 20 includes, at the rear base portion 101 of the lamp body, at least a ring-shaped reference formation 201 defining a reference plane RP transversely of reference axis X10.

For example, US Patent Application published as US2010/0213809 (Roehl), already mentioned in the foregoing, describes an automotive (H7-type) lamp formed on a conventional lamp cap, having a reference ring including a ring having lugs on three sides, which in turn define said reference plane RP. This application is incorporated herein by reference in its entirety.

At any rate, the solution shown herein is only one among various possible solutions for mounting lamp 10 on such a support body as a projector P of a motor vehicle lamp, e.g., via connections substantially comprising quarter-turn connections.

The ring-shaped member 20 illustrated herein generally exemplifies a member configured for mounting the lamp on a vehicle, said member comprising, at the rear part of the lamp body, at least one reference formation (such as a ring-shaped flange 201) adapted to define a reference plane (denoted as RP in FIG. 5) transversely of longitudinal axis X10.

As discussed in the following, one or more embodiments according to FIG. 2 and following may differ from the solution shown in FIG. 1 as regards the second (high-beam) array of light sources denoted as 142.

Figure 1:
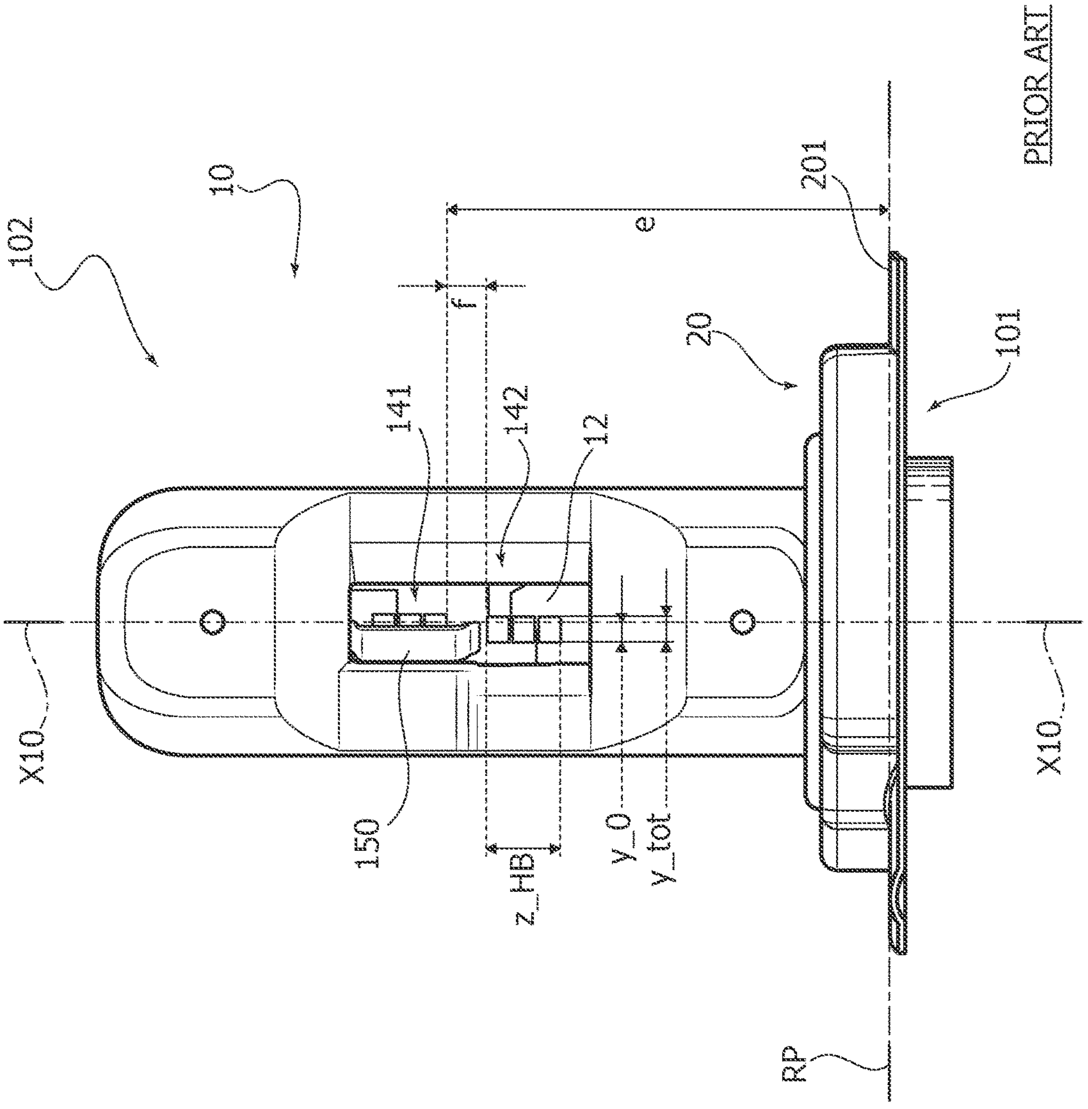
FIG. 1, representative of the known art, has already been discussed in the foregoing.

Indeed, in the solution shown in FIG. 1, both arrays 141 and 142 consist of three LEDs aligned in the direction of axis X10.

On the other hand, in one or more embodiments as shown in FIG. 2, array 142 comprises three LEDs arranged according to a generally L-shaped configuration.

With reference to the general description of lamp 10 in FIG. 2 and following, in a mounting condition as exemplified in FIG. 3, member 12 may be oriented in a substantially vertical direction, with the LED arrays 141, 142 projecting light radiation in a substantially horizontal direction, starting from the opposed faces of the plate member 12, radially, i.e., laterally to axis X10.

In one or more embodiments, the light sources (e.g., LEDs as described in the foregoing) may be arranged on the plate-like member 12 with the interposition of a material having a finish and/or a colour feature (or, in general, optical properties) adapted to enhance the performance of lamp 10. A so-called solder mask may exemplify such a material.

As may be appreciated in FIG. 2, in one or more embodiments the support member 12 may be arranged between two complementary, e.g., shell-shaped, pieces 161, 162 of moulded (metal or plastics) material.

For example, member 12 may be sandwiched between the complementary pieces 161, 162, forming an assembly which can be mounted via screws 18 traversing respective holes provided in the pieces 161, 162 and in the plate-like member 12 sandwiched between said pieces.

In one or more embodiments, the rear end 101 of the lamp body (comprising elements 12, 161 and 162) may have a generally sculptured structure (e.g., a finned structure) having heatsink properties.

In one or more embodiments, both complementary pieces 161, 162 may be made of a material (e.g., a metal or plastics material) having heat conductive properties: this favours the transfer of heat generated by LED sources 141, 142 towards the rear end 101, contributing to dissipating the heat generated by sources 141, 142 in operation.

In one or more embodiments as exemplified herein, the rear end 101 of body 10 may be shaped as a sort of box or cage adapted to house electric/electronic circuitry 21 (of a kind known in itself), which are adapted to supply the light sources 141, 142 through electrically conductive lines—not visible in the Figures—which are provided e.g., in the form of printed circuit tracks on member 12.

As stated in the foregoing, in one or more embodiments the lamp body 10 may have fixation members associated thereto, such as for example a ring-shaped mounting member 20 optionally having a sealing member 202 associated thereto.

In one or more embodiments as exemplified herein, the lamp body 10 (including, in the presently illustrated examples—which indeed are shown by way of example only—the complementary pieces 161, 162 enclosing member 12) may be provided, intermediate ends 101 and 102, and advantageously nearer to front end 102, with two tray-shaped grooves 221, 222.

In the presently considered exemplary embodiments, said grooves have the approximate shape of a funnel, having bottom apertures which are more clearly visible in the exploded perspective view of FIG. 2.

In the assembled lamp body, grooves 221, 222 originate two mutually opposed recesses, each recess having a respective planar bottom surface given by member 12 carrying the light sources 141, 142 and by the regions of member 12 surrounding the latter, said surface being surrounded by respective peripheral sources.

The light radiation from sources 141 and 142 is projected from the lamp body 10 (in a generally radial direction with respect to axis X10, and horizontally, considering the possible mounting condition onto a support/projector P exemplified in FIG. 3) and is adapted to traverse respective light-permeable portions provided at the bottom of the grooves/recesses 221, 222.

Said light radiation is projected:

partially, directly to the outside of the lamp 10, being adapted to be reflected on the surface of projector P (see FIG. 2), and partially, by exiting lamp 10 indirectly, i.e., by being reflected on the surface of projector P, after being reflected on the surface of the grooves/recesses 221, 222.

Such aspects as discussed in the foregoing are extensively treated in the European Patent Application 20209701.0 filed on 25 Nov. 2020 with Priority Claim of Italian Patent Application 102019000024226, filed on 17 Dec. 2019 (inventors: Apuzzo, Bizzotto, Castellan), which has already been mentioned in the introduction to the present specification. This application is therefore incorporated herein by reference in its entirety.

As stated in the foregoing, in the solution shown in FIG. 1, both arrays 141 and 142 consist of three LEDs aligned in the direction of axis X10.

In one or more embodiments as illustrated in FIG. 2:

the array 141 (low-beam array), which has the shield 150 associated thereto, again comprises three LEDs aligned in the direction of axis X10;

the array 142 (high-beam array), on the contrary, comprises three LEDs arranged according to a generally L-shaped configuration.

In the array 142, therefore, it is possible to distinguish two array ends, which in turn may be defined as rear or proximal end and front or distal end) similarly to what has been stated for ends 101 and 102 of lamp 10.

It will be observed, moreover, that the second array of light sources 142 as shown in FIG. 2 and following is not optically coupled to shield 150, i.e., it is optically uncoupled from shield 150.

In the second array of light sources 142 as shown in FIG. 2 and following, on the other hand, it is possible to distinguish:

a first single row 144 of solid-state light sources (i.e., sources 1420 and 1421) extending longitudinally to lamp 10 (i.e., at least approximately in the direction of reference axis X10) between a proximal side (source 1421) of the second row 142, facing towards the proximal base portion 101 of the lamp body, and a distal side (source 1420) of the second array 142 itself, facing towards the first array of solid-state light sources (141), and a second single row 146 of solid-state light sources (i.e., sources 1420 and 1422) extending transversely of lamp 10 (i.e., at least approximately in a direction transverse of reference axis X10) at said distal side (source 1420) of the second array 142, facing towards the first array of solid-state light sources 141.

As discussed in the following, the second array of solid-state light sources 142 is adapted to provide a light emission power which is higher on the distal side thereof (identified by sources 1420, 1422 of row 146) as compared to the proximal side (identified by source 1421).

In the second row of light sources 142 as shown in FIG. 2 and following, said first single row 144, i.e., sources 1420 and 1421, and said second single row 146, i.e., sources 1420 and 1422, share a common light source (i.e., source 1420) which is located, for example, at a corner position in the second array of light sources 142.

Figure 4:
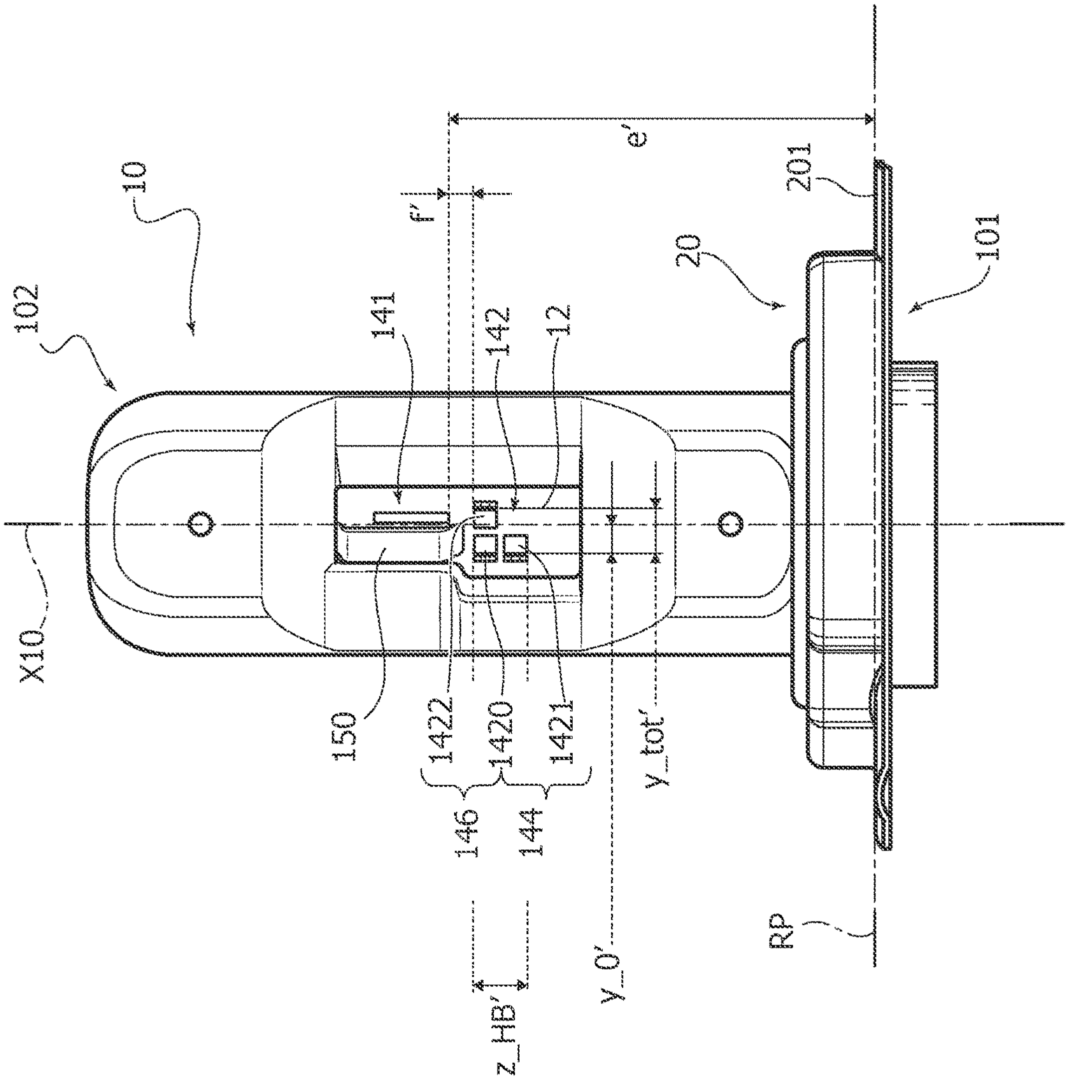
FIG. 4 is a further side elevation view of a lamp according to embodiments, highlighting various geometrical and dimensional features of the lamp shown.

As can be seen in FIG. 4, said first single row 144, i.e., sources 1420 and 1421, extends laterally offset to the reference axis (X10).

Moreover, as can be also seen in FIG. 4:

the first array of light sources 141 is arranged on support member 121 in register with the reference axis X10 (i.e., approximately striding axis X10, the axis X10 intersecting all three sources of array 141);

the shield 150, optically coupled to the first array of light sources 141, comprises an elongated shield extending parallel to the reference axis X10, laterally offset to the latter;

the first single row 144 of light sources (i.e., sources 1420 and 1421) of the second array 142 extends parallel to reference axis X10, aligned with the elongated shield 150;

the second single row 146 of light sources (i.e., light sources 1420 and 1422) of the second array 142 comprises a light source (i.e., source 1422, different from source 1420 at the corner position) which is intersected by the reference axis X10.

In other words, said light source 1420 (which is common and at the corner position in the second array of solid-state light sources 142) is laterally offset to the reference axis X10, and the second single row of sources 146 in the second array of sources 142 comprises a further light source (i.e., source 1422) which is intersected by reference axis X10.

In one or more embodiments, the solid-state light sources 1420, 1421, 1422 included in the second array 142 may have the same luminous flux.

In one or more embodiments, the second array of light sources 142, on each side of lamp 10, may comprise no more than three solid-state light sources (i.e., the three LEDs 1420, 1421, 1422), each having a luminous flux of approximately 250-300 lumen [lm].

In one or more embodiments, the second array of solid-state light sources 142 may consist of a first 1420, a second 1421 and a third 1422 solid-state light source, wherein:

the first source 1420 and the second source 1421 identify said first single row 144 which extends longitudinally of lamp 10, e.g., parallel to reference axis X10, the first source 1420 and the third source 1422 identify said second single row 146 which extends transversely of lamp 10, orthogonal to reference axis X10.

In one or more embodiments, lamp 10 may include a mounting member 20 configured to mount lamp 10 on a vehicle (projector P in FIG. 3), such mounting member comprising, at the rear base portion of the lamp body, at least a reference formation (such as ring 201) defining a reference plane RP transversely of reference axis X1.

In one or more embodiments, the second array of solid-state light sources 142 (in the present case, sources 1420, 1421, 1422) may comprise LEDs, optionally top-emitting LEDs.

In one or more embodiments, the second array of solid-state light sources 142 (in the present case, sources 1420, 1421, 1422) may comprise LEDs, optionally top-emitting LEDs, being all LEDs of the same nature.

Advantageously, said features may be adopted also for the first array of sources 141.

In one or more embodiments, the second arrays of solid-state light sources 142 (and advantageously also the first arrays 141) on the one and the other opposed sides of support member 12 are arranged mirror-symmetrically on the two sides of support member 12.

This feature may be appreciated for example in FIG. 3, where it is possible to see that, with the lamp 10 mounted with the axis X10 horizontal or substantially horizontal, the two LEDs 1420, 1421 of the longitudinal row 144 are at a lower position than LED 1422, a similar arrangement being found on the opposite side of the lamp, not visible in the Figure.

Embodiments as illustrated in FIG. 2 and following successfully solve the problem of compliance with ECE R112 Class B Regulation for high-beam applications, also as regards the specifications of point 6.3.3.1, i.e., achieving 80% of the maximum intensity at the H-V (0,0) central point.

It has been observed that existing/previous products, such as the product described in the foregoing with reference to FIG. 1, have a linear LED array or cluster, such as array 142, which cannot focus the light around the centre point, as it is desired in order to comply with the regulation. This is particularly true for a linear array 142 (see FIG. 1) carrying side-emitting LEDs (more precisely, LEDs having a marked side distribution of the side emission).

One or more embodiments provide a new shape for array 142 and, advantageously, envisage the use of top-emitting LEDs in order to increase the intensity values.

The efficacy of such a choice is confirmed by a simulation through a technique of back-ray-tracing optical simulation, assuming that the LEDs in array 1442 may be distributed on an area of support 12 (PCB) so as to enable generating light in the correct positions of a high-beam, according to regulation requirements.

Such a back-ray-tracing technique may be applied, for example, to a square-shaped high-beam headlight. Similar results may however be achieved also with other 3D models of headlights, having a circular or rounded shape.

In practice, such analysis enables to understand from what area of support 12 the light in H-V (0,0) comes.

In this respect, the back-ray-tracing technique may be seen as a sort of reverse engineering applied on the system consisting of the lamp and the projector.

For example, by using a back-ray-tracing simulation tool such as the software available from Synopsys, Inc. of Mountain View, California (USA) under the trade name LightTools, it is possible to simulate the light impinging on PCB (support member 12) and coming from a dummy light source which is positioned in the H-V (0,0) point at 25 m from the system (as known to a person skilled in the art, 25 m is the distance between the system and the test points which is currently adopted during optical measurements).

In this way it is possible to verify that the point where the light impinging on the PCB exhibits the maximum light intensity is distributed near shield 150, slightly below the normal position of the filament of a halogen lamp (i.e., the position of the high-beam LED linear array 142) in a solution such as previously described with reference to FIG. 1.

Without being bound to any specific theory, a further confirmation derives from a conventional forward analysis (from the system to the test points) aimed at identifying the contribution of each LED on the HV test points in a standard linear configuration with three LEDs, corresponding to a linear array 142 as shown in FIG. 1.

The simulation may be performed for the high-beam function by using a simulation tool such as the software available from Synopsys, Inc. of Mountain View, California (USA) under the trade name LucidShape, by switching on only the array 142 which is optically uncoupled with respect to the shield 150.

The results confirm (with reference to both sides of lamp 10, the LED arrays being symmetrically duplicated on the two opposed sides of support 12) that, in the case of a linear array such as array 142 in FIG. 1, the rearmost LED, in the linear array, i.e., the LED farthest away from shield 150, contributes very weakly to the total light intensity distribution.

Specifically, the maximum light intensity of the LED farthest away from shield 150 approximately amounts to 16500 cd, as opposed to the value of 43100 cd generated by the foremost LED in the linear array, i.e., the LED closest to shield 150.

In other words, it is possible to verify that the LED farthest away from shield 150 does not focus the light where it would be desirable and does not contribute appreciably around the H-V (0,0) point; the contribution to the total light uniformity is rather weak.

The combination of these items of information confirms the efficacy of the solution adopted for the array 142 as shown in FIG. 2 and following.

This solution enables achieving more benefits also from the third LED, by shifting it forward, and by imparting to array 142, for example, an L-shaped configuration. These measures are based on a principle other than the usual attempt to reproduce, as faithfully as possible, the linear shape of the filament in a conventional lamp.

In such a "non-linear" (e.g. L-shaped) array, LEDs 1420, 1421 and 1422 are better exploited in terms of light intensity and light distribution on the HV test points.

In such an array, LEDs 1420, 1421 and 1422 are so to say "concentrated" near shield 150, which improves the homogeneity of the light distribution, also leading to an increase of the intensity values.

Such an array is compatible with the mechanical components of a conventional lamp 10 (FIG. 1) and with the manufacturing process thereof, as currently employed in the production of the present H4-type retrofit lamp.

Table III shows, with reference to FIG. 4, some possible features of embodiments. Such features are shown for immediate reference and for a comparison with the features recalled in previous Table I relating to a H4 3.5 OSRAM LED lamp and to a conventional H4 filament lamp.

TABLE III

| Embodiments | |
|---|---|
| Lamp type<br>Source | Present specification<br>Luxeon Z ES (6x) -<br>see lumileds.com/ |
| e': distance Lo-Beam array 141/reference plane RP [mm] | 28.5 |
| f': distance (separation) between Lo-Beam 141 and Hi-Beam 142 arrays [mm] | 1.7 |
| y_o': distance outer edge of longitudinal row 144 (LEDs 1420, 1421)/reference axis [mm] | 2.25 |
| y_tot': width of Hi-Beam array 142 (length of transversal row 146 - LEDs 1420 and 1422) | 3.34 |
| Z_HB': length of Hi-Beam array 142 (length of longitudinal row 144 - LEDs 1420 and 1421) [mm] | 3.34 |
| Luminous Flux [lm] (referred to arrays of three LEDs on the two sides of the lamp - 6x) | (min) 1500 (Hi-Beam)/ 1100 (Lo-Beam) 6x |

An advantage of such a solution is the compliance with ECE 112 Class B Regulation for high-beam lights.

Thanks to the arrangement of the LEDs, as illustrated in FIG. 2 and following, the radiation pattern generated by lamp 10 is more intense, and the light is distributed more uniformly around the H-V (0,0) point than in the conventional solutions, therefore better approaching the light distribution of a standard filament lamp.

This is true even though a LED array 142 as illustrated in FIG. 2 and following is L-shaped, and therefore does not have the linear shape of a filament.

Figure 5A:
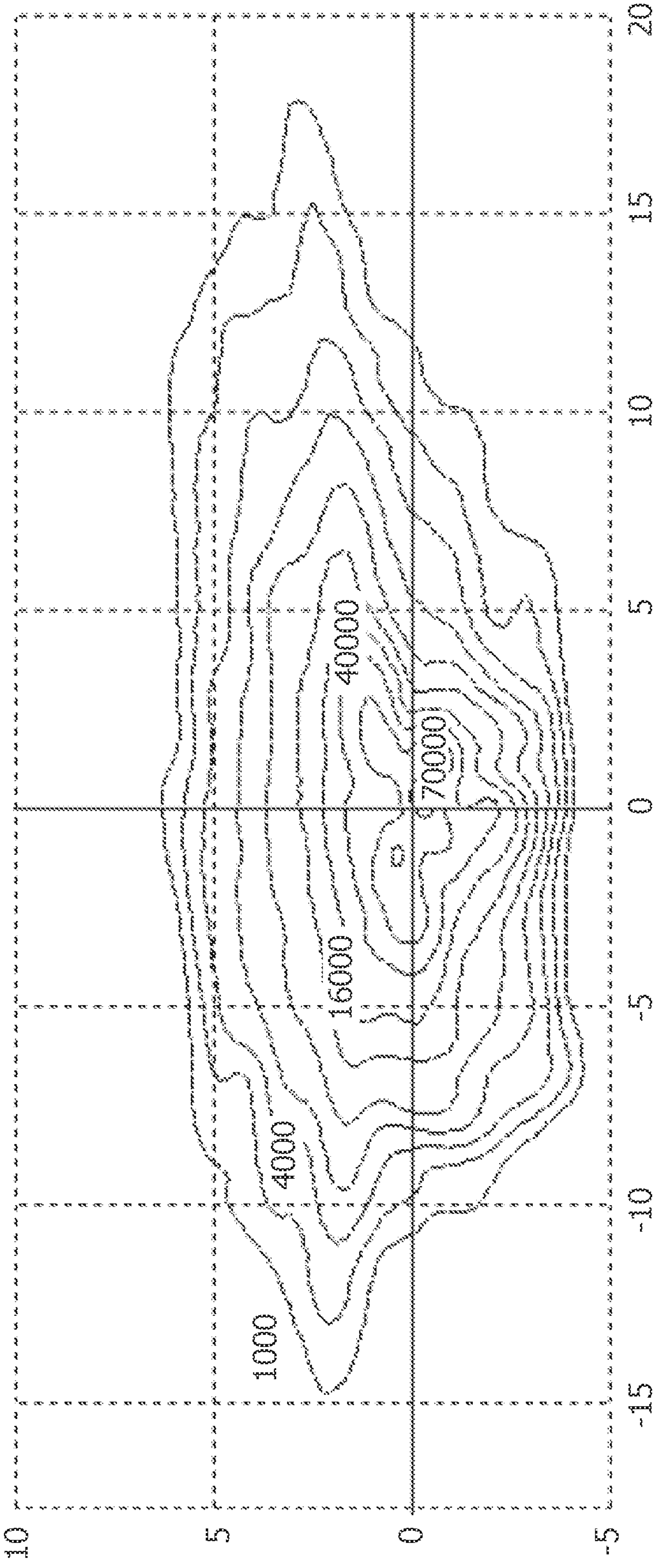
FIGS. 5A and 5B are graphs illustrating operation features of a lamp according to embodiments (FIG. 5B) as compared to solutions taken as a reference (FIG. 5A)
Figure 5B:
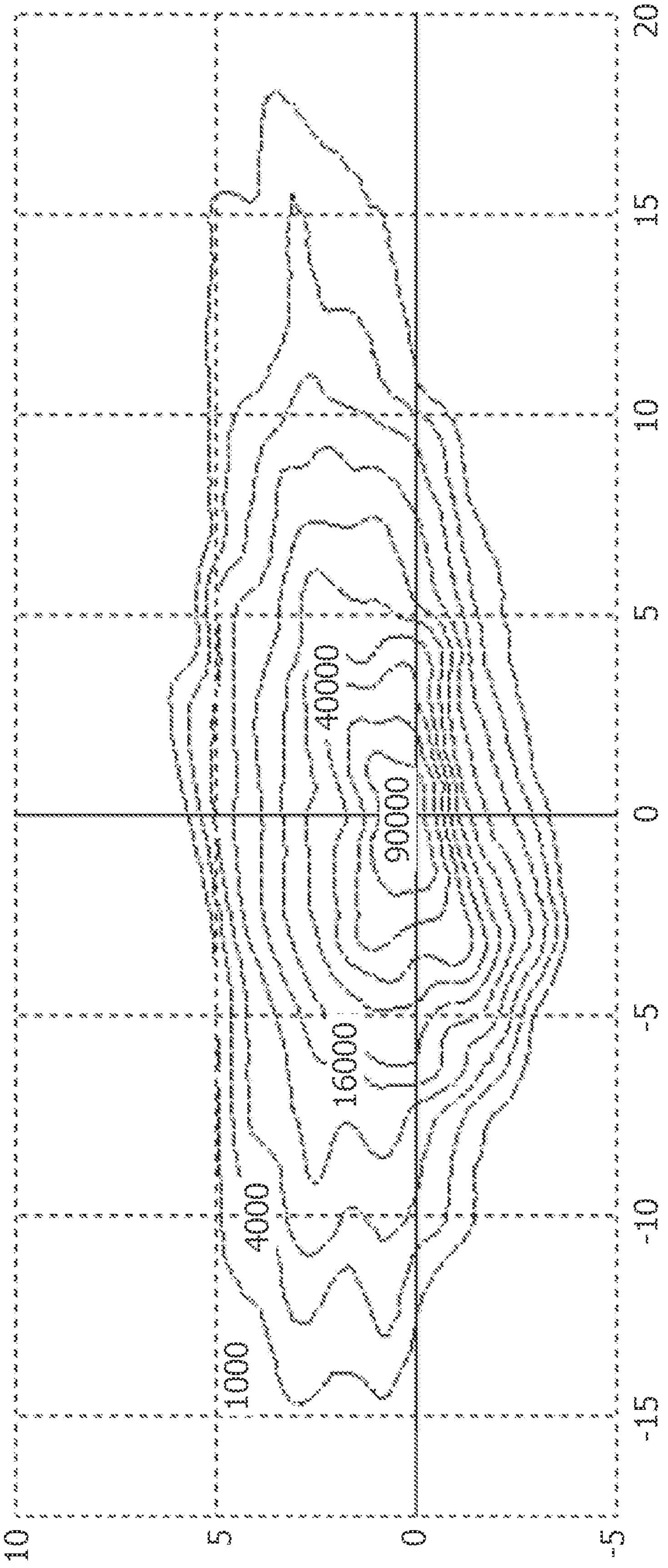

FIGS. 5A and 5B show light distributions simulated by using the simulation tool LucidShape available from Synopsis, Inc. (which has already been mentioned in the foregoing).

Specifically:

FIG. 5A shows the light distribution simulated with a 3D model for a standard LED configuration (i.e., a linear array as illustrated in FIG. 1), and FIG. 5B shows the light distribution simulated with a 3D model for an L-shaped array, as shown in FIG. 2 and following.

In the graphs of FIGS. 5A and 5B the scales on the abscissa and the ordinate axes refer to angles (in degrees) of the projection direction of the light beam.

The graphs show isocandela lines with respective values expressed in candles (cd) corresponding to 70000, 40000, 16000, 4000 and 1000 cd (FIG. 5A) and 90000, 40000, 16000, 4000 and 1000 cd (FIG. 5B).

It will be appreciated that both FIGS. 5A and 5B refer to top-emitting LEDs.

FIGS. 5A and 5B show that the radiation pattern of the L-shaped arrangement (FIG. 5B) is more uniform and the maximum light intensity (Emax) is higher by 21% (from 75500 cd to 91400 cd).

Figure 6A:
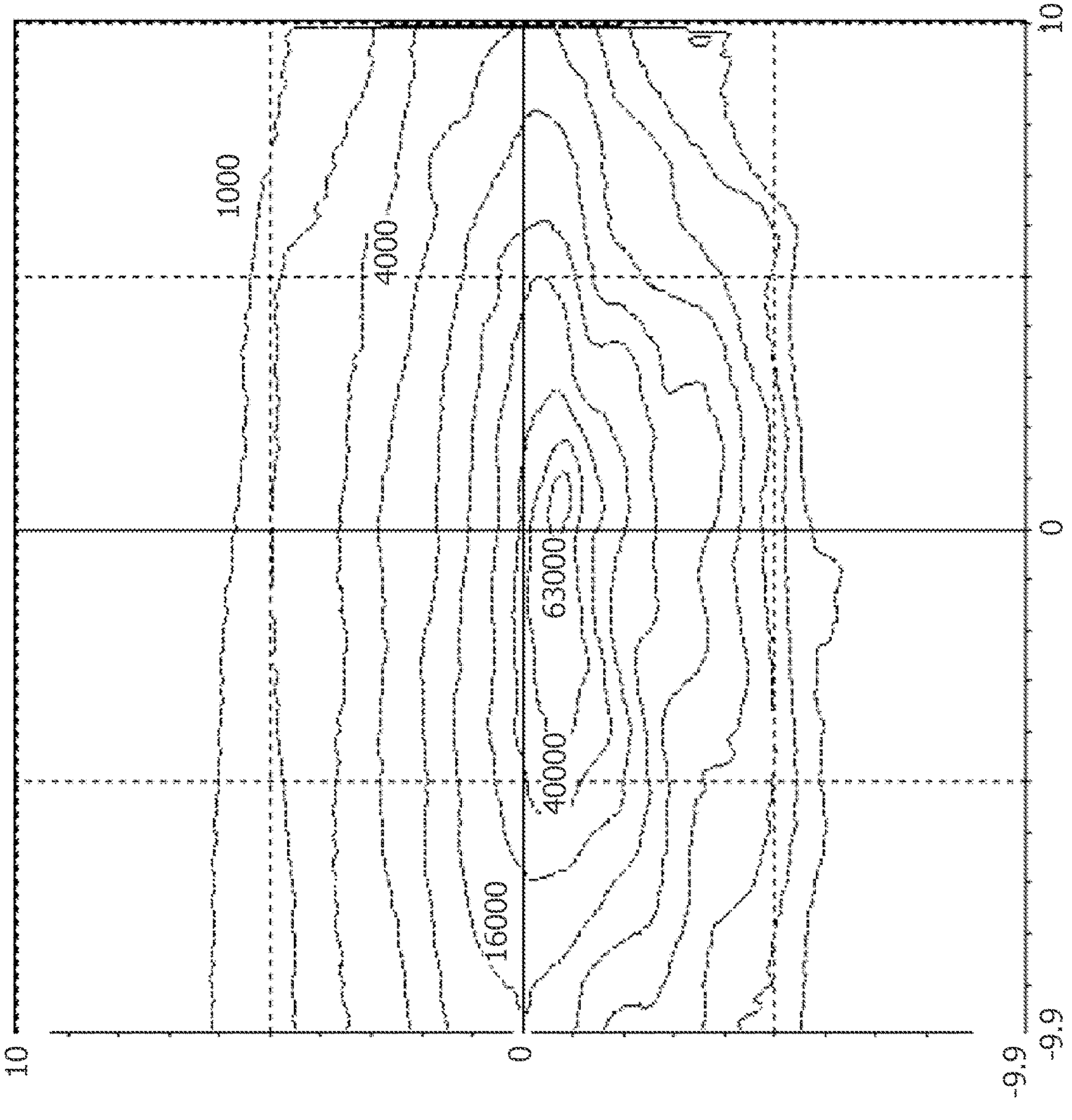
FIGS. 6A and 6B are graphs illustrating operation features of a lamp according to embodiments (FIG. 6B) as compared to solutions taken as a reference (FIG. 6A).
Figure 6B:
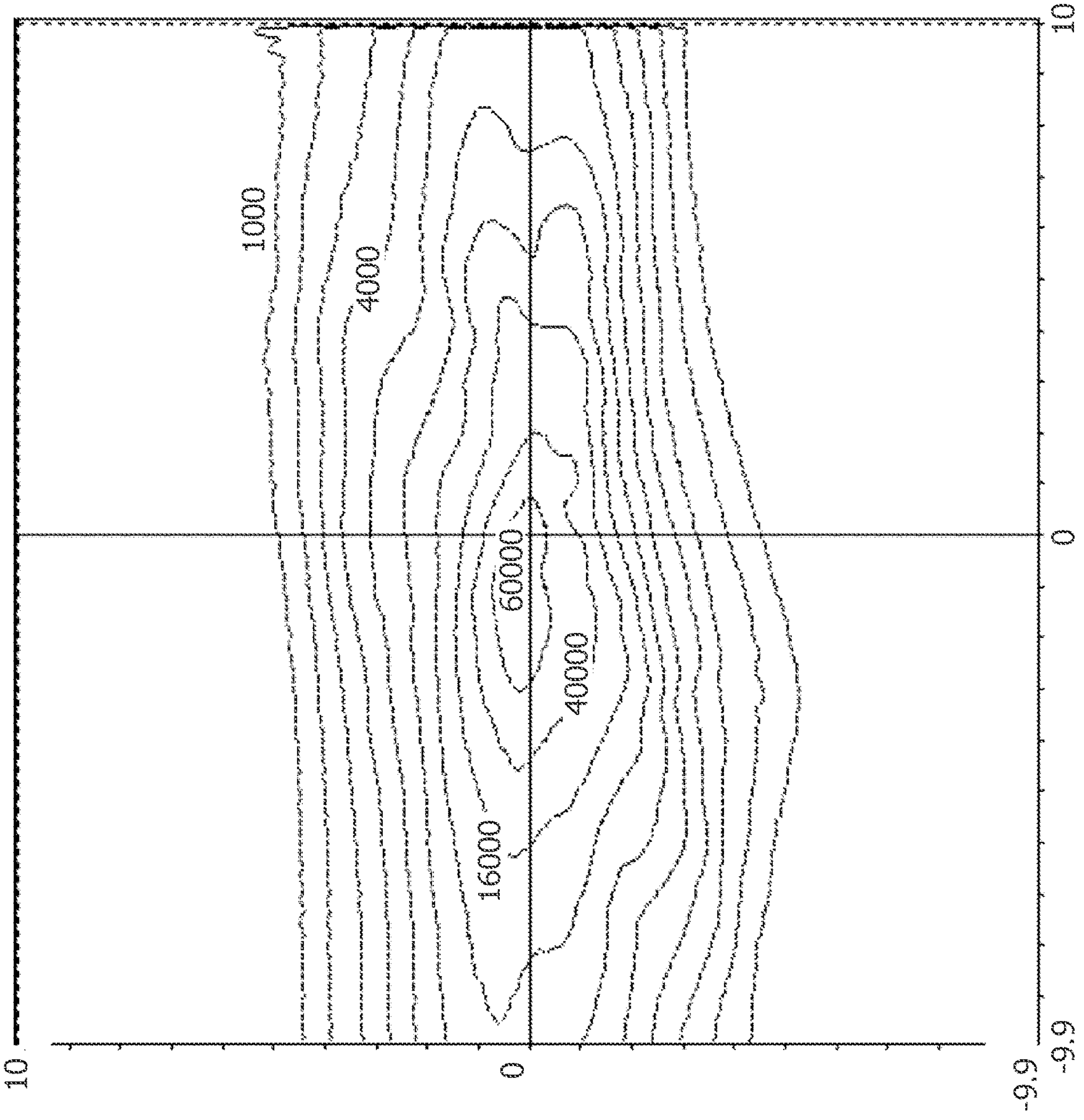

FIG. 6A shows the light distribution measured for a standard LED configuration (i.e., a linear array, as shown in FIG. 1) compared to the light distribution detected in an L-shaped array, shown in FIG. 6B.

The measurements were performed on a headlight of a motor vehicle Skoda Fabia, by using measurement software available from EVERFINE Corporation of Hangzou, China.

Also in the graphs of FIGS. 6A and 6B the scales on the abscissa and the ordinate axes refer to angles (in degrees) of the projection direction of the light beam.

The graphs of FIGS. 6A and 6B show isocandela lines with respective values expressed in candles (cd) corresponding to 63000, 40000, 16000, 4000 and 1000 cd (FIG. 6A) and 60000, 40000, 16000, 4000 and 1000 cd (FIG. 6B).

Although the support (PCB 12) is not optimized as regards the electric layout and the thermal dissipation, the graphs in FIGS. 6A and 6B confirm the improvement of uniformity in the L-shaped radiation pattern (FIG. 6B), because all LEDs in the array 142 contribute appreciably to the radiation pattern, unlike the case of a linear array, wherein the LED farthest away from shield 150 (and closest to mounting member 20) contributes weakly, with the risk of generating a non-homogeneous lighting configuration.

Specifically:

the graph of FIG. 6A (light intensity distribution for a linear high-beam array) shows a spot in the H-V (0,0) position, and in addition a few lighter-coloured areas on one side (on the left) of the H-V (0,0) position, and the graph of FIG. 6B (light intensity distribution for an L-shaped high-beam array) practically shows only one spot, around the H-V (0,0) position.

It will be appreciated, moreover, that one or more embodiments may envisage repositioning the shield 150.

For the sake of completeness and essentially by way of reference, Table IV shows the results obtained from a simulation of one and the same projector P respectively referring to:

a conventional halogen lamp, a linear high-beam array 141 (FIG. 1), and an L-shaped high-beam array 142 (FIG. 2 and following).

The results, shown in Table IV for the sake of completeness and by way of reference, were obtained with the simulation tool LucidShape available from Synopsys, as already mentioned.

The values are expressed in candles (cd).

TABLE IV

| ECE R 112 Classe B - High Beam | | | | | |
|---|---|---|---|---|---|
| | Min | Max | Halogen | Linear array 142 | L-shaped array 142 |
| $E_{max}$ | 40500 | 215000 | 86169 | 75467 | 91435 |
| $E_{max}$ Coordinates | | | H: 0.1<br>V: 0.7 | H: 0.3<br>V: −0.3 | H: −0.7<br>V: −0.7 |
| H-V | >80% | | 64709 | 58275 | 75098 |
| H-5L | 5100 | | 17941 | 17145 | 12966 |
| H-2.5L | 20300 | | 43232 | 50412 | 45562 |
| H-2.5R | 20300 | | 20170 | 14637 | 29569 |
| H-5R | 5199 | | 5899 | 4364.8 | 8197 |

As can be seen, while keeping the number of LEDs and the LED-generated flux constant, the maximum intensity (Emax) was increased by approximately 15000 cd, from a standard linear LED array to an L-shaped array, therefore correctly complying with the regulatory specifications.

One of the advantages of the embodiments is the improvement of the uniformity of the radiation pattern and the increase of the intensity values on the HV test points, in comparison with a standard linear array.

One or more embodiments favour a more efficient use of the LED emission: by using the same number and the same luminous flux it is possible to obtain a maximum intensity value (Emax) higher than in a conventional linear arrangement (and also higher than in a conventional halogen lamp).

As illustrated herein—by way of example only—an automotive solid-state lamp (e.g., 10) for a vehicle (see for example projector P) comprises a lamp body (e.g., 12, 161, 162, 20) extending along a longitudinal reference axis (e.g., X10) between a proximal base portion (e.g., 101) and a distal front portion (e.g., 102), wherein the lamp body comprises a support member (e.g., 12) having a first and a second opposed sides, wherein each one of the opposed sides of the support member has arranged thereon:

a first array of solid-state light sources (e.g., 141) having a shield (e.g., 150) optically coupled therewith and configured to provide, when energized, an automotive low-beam, a second array of solid-state light sources (e.g., 142) located between the base portion and the first array of solid-state light sources, the second array of solid-state light sources being spaced from the first array of solid-state light sources and configured to provide, when energized, an automotive high-beam.

In a lamp as illustrated herein, the second array of solid-state light sources (142) consists of:

a first single row (e.g., 144; 1420, 1421) of solid-state light sources extending longitudinally of the lamp body between a proximal side (e.g., 1421) of the second array facing towards the proximal base portion and a distal side (e.g., 1420) of the second array facing towards the first array of solid-state light sources, and a second single row (e.g., 146; 1420, 1422) of solid-state light sources extending transversely of the lamp body at said distal side (e.g., 1420) of the second array facing towards the first array of solid-state light sources.

In a lamp as illustrated herein, said first single row (e.g., 144) and said second single row (e.g., 146) of solid-state light sources share a single common solid-state light source (e.g., 1420) in the second array of solid-state light sources.

In a lamp as illustrated herein, said single common solid-state light source (e.g., 1420) is at a corner position in the second array of solid-state light sources.

In a lamp as illustrated herein, said single common solid-state light source (e.g., 1420) in the second array of solid-state light sources is laterally offset to said reference axis (e.g., X10) and said second single row in the second array of solid-state light sources comprises a further solid-state light source (e.g., 1422) intersected by said reference axis.

In a lamp as illustrated herein, the second array of solid-state light sources (e.g., 142) is L-shaped.

In a lamp as illustrated herein, the first single row (e.g., 144) of solid-state light sources in the second array of solid-state light sources extends laterally offset to said reference axis.

In a lamp as illustrated herein:

the shield (e.g., 150) optically coupled to the first array of solid-state light sources comprises an elongated shield (which is substantially straight, and therefore longer than it is wide) extending parallel to said reference axis, and the first single row of solid-state light sources extends parallel to said reference axis aligned with said elongated shield.

In a lamp as illustrated herein, the first array of solid-state light sources (e.g., 141) is arranged on the support member in register with (i.e., aligned with) said reference axis (e.g., X10), and said second single row of solid-state light sources in the second array of solid-state light sources comprises a solid-state light source (e.g., 1422) intersected by said reference axis.

In a lamp as illustrated herein, the solid-state light sources (e.g., 1420, 1421, 1422) in the second array of solid-state light sources have the same luminous flux.

In a lamp as illustrated herein, the second array of solid-state light sources consists of three solid-state light sources (e.g., 1420, 1421, 1422).

In a lamp as illustrated herein, the second array of solid-state light sources consists of a first (e.g., 1420), a second (e.g., 1421) and a third (e.g., 1422) solid-state light source, wherein:

the first solid-state light source (e.g., 1420) and the second solid-state light source (e.g., 1421) provide said first single row of solid-state light sources extending longitudinally of the lamp body, and the first solid-state light source (e.g., 1420) and the third solid-state light source (e.g., 1422) provide said second single row of solid-state light sources extending transversely of the lamp body at said distal side of the second array.

In a lamp as illustrated herein, the second array of solid-state light sources consists of solid-state light sources (e.g., 1420, 1421, 1422) each having a luminous flux between about 250 lumen and about 300 lumen.

In the presence of six (6×) such sources (three for each array 142 for each side or face of the lamp 10) the overall (high-beam) luminous flux may therefore amount to 1500-1800 lumen.

In a lamp as illustrated herein, the second array of solid-state light sources (e.g., 142; 1420, 1421, 1422) comprises LEDs, optionally top-emitting LEDs.

In a lamp as illustrated herein, the second arrays of solid-state light sources (e.g., 142) on the one and the other of the opposed sides of the support member are arranged mirror-symmetrically on the two sides of the support member.

Without prejudice to the basic principles, the implementation details and the embodiments may vary, even appreciably, with respect to what has been illustrated herein by way of non-limiting example only, without departing from the extent of protection.

The invention claimed is:

1. An automotive solid-state lamp for a vehicle, the lamp comprising:

a lamp body extending along a longitudinal reference axis between a proximal base portion and a distal front portion, wherein the lamp body comprises a support member having first and second opposed sides, and wherein each one of the opposed sides of the support member has arranged thereon:

a first array of solid-state light sources having a shield optically coupled therewith and configured to provide, when energized, an automotive low-beam, a second array of solid-state light sources located between the base portion and the first array of solid-state light sources, the second array of solid-state light sources spaced from the first array of solid-state light sources and configured to provide, when energized, an automotive high-beam, wherein the second array of solid-state light sources comprises:

a first single row of solid-state light sources extending longitudinally of the lamp body between a proximal side of the second array adjacent the proximal base portion and a distal side of the second array adjacent the first array of solid-state light sources, and a second single row of solid-state light sources extending transversely of the lamp body at the distal side of the second array adjacent the first array of solid-state light sources.

2. The lamp of claim 1, wherein the first single row and the second single row of solid-state light sources share a single common solid-state light source in the second array of solid-state light sources.

3. The lamp of claim 2, wherein the single common solid-state light source is at a corner position in the second array of solid-state light sources.

4. The lamp of claim 2, wherein the single common solid-state light source in the second array of solid-state light sources is laterally offset to the reference axis and the second single row in the second array of solid-state light sources comprises a further solid-state light source intersected by the reference axis.

5. The lamp of claim 1, wherein the second array of solid-state light sources is L-shaped.

6. The lamp of claim 1, wherein the first single row of solid-state light sources in the second array of solid-state light sources extends laterally offset to the reference axis.

7. The lamp of claim 1, wherein the shield optically coupled to the first array of solid-state light sources comprises an elongated shield extending parallel to the reference axis, and wherein the first single row of solid-state light sources extends parallel to the reference axis aligned with the elongated shield.

8. The lamp of claim 1, wherein the first array of solid-state light sources is arranged on the support member in register with the reference axis, and wherein the second single row of solid-state light sources in the second array of solid-state light sources comprises a solid-state light source intersected by the reference axis.

9. The lamp of claim 1, wherein the solid-state light sources in the second array of solid-state light sources have the same luminous flux.

10. The lamp of claim 1, wherein the second array of solid-state light sources consists of three solid-state light sources.

11. The lamp of claim 10, wherein the second array of solid-state light sources consists of a first solid-state light source, a second slid-state light source and a third solid-state light source, wherein the first solid-state light source and the second solid-state light source provide the first single row of solid-state light sources extending longitudinally of the lamp body, and wherein the first solid-state light source and the third solid-state light source provide the second single row of solid-state light sources extending transversely of the lamp body at the distal side of the second array.

12. The lamp of claim 1, wherein the second array of solid-state light sources consists of solid-state light sources each having a luminous flux between about 250 lumen and about 300 lumen, inclusive.

13. The lamp of claim 1, wherein the second array of solid-state light sources comprises LEDs.

14. The lamp of claim 13, wherein the second array of solid-state light sources comprises top-emitting LEDs.

15. The lamp of claim 1, wherein the second arrays of solid-state light sources arranged on the one and the other of the opposed sides of the support member are arranged mirror-symmetrically on two sides of the support member.

* * * * *